United States Patent [19]

Colson

[11] Patent Number: 4,657,268

[45] Date of Patent: Apr. 14, 1987

[54] IMPLEMENT TRANSFER CARRIAGE

[76] Inventor: Norman E. Colson, 7240 Lavalle Dr., Centerville, Minn. 55038

[21] Appl. No.: 754,593

[22] Filed: Jul. 15, 1985

[51] Int. Cl.$^4$ ................................................. B62B 1/04
[52] U.S. Cl. ..................................... 280/47.27; 414/456
[58] Field of Search .............. 280/47.24, 47.26, 47.28, 280/48.27; 24/265 AL, 265 C, 514, 569; 414/454, 455, 456

[56] References Cited

U.S. PATENT DOCUMENTS

| | | | |
|---|---|---|---|
| 2,634,189 | 4/1953 | Hill | 280/47.18 X |
| 2,673,654 | 3/1954 | Kaufman | 414/456 X |
| 2,784,856 | 3/1957 | Jordon | 414/456 |
| 2,784,979 | 3/1957 | Chamberlin et al. | 280/47.26 X |
| 2,827,190 | 3/1958 | Spitzmesser | 280/47.24 X |
| 3,104,889 | 9/1963 | Branch, Jr. | 280/30 |
| 3,179,270 | 4/1965 | Taragos | 280/47.18 X |
| 3,462,171 | 8/1969 | Mitty et al. | 280/47.26 |
| 3,666,285 | 5/1972 | Fertig | 280/47.12 |
| 4,219,213 | 8/1980 | Butcher | 280/475 |
| 4,335,990 | 6/1982 | Apter et al. | 414/457 |
| 4,392,687 | 7/1983 | O'Connell | 298/5 |
| 4,398,737 | 8/1983 | Harding | 280/47.13 R |
| 4,531,752 | 7/1985 | Diener | 280/47.18 |

*Primary Examiner*—John J. Love
*Assistant Examiner*—Michael Mar
*Attorney, Agent, or Firm*—Lawrence M. Nawrocki

[57] ABSTRACT

A carriage device (12) for use with a floor working implement (10) such as a scrubber or polisher. The carriage (12) includes a track (50) for receiving and retaining therein a downwardly projecting lip of the implement (10) such as transport wheels (28). With the lip received within an aperture (54) in the track (50), a link (60) provided, in a first embodiment, on an arm (40) of the maneuvering handle (16) of the implement (10) can be slid downwardly over the arm (40) and over a strut (56) extending upwardly from the track (50) in order to maintain the strut (56) locked alongside the handle arm (40). In a second embodiment, a clip (64) carried by the strut (56) can be utilized to lock the arm (40) alongside the strut (56).

10 Claims, 5 Drawing Figures

4,657,268

IMPLEMENT TRANSFER CARRIAGE

TECHNICAL FIELD

The present invention is related broadly to the field of carriages for transporting various implements from one location to another. More narrowly, the invention relates to such carriages for transporting implements such as floor polishers, scrubbers, and other similar devices. A preferred embodiment of the invention is directed to such apparatus for use with implements of a nature as described and having integral transport wheels which are provided to move the implement over a surface being worked during its operation.

BACKGROUND OF THE INVENTION

Various types of floor cleaning, scrubbing, and polishing implements are presently available commercially for use for residential and industrial purposes. Such implements are used for cleaning and scrubbing various types of hard surface floors such as cement, quarry tile, ceramic tile, terrazzo, and wood in addition to vinyl. Some locations in which cleaning, scrubbing, and polishing implements are designed to be used are provided with carpeting when intended to be used in such environments, the implements must be configurable to address the unique problems presented by commercial, shag, and plush carpeting.

Additionally, some areas in which implements of this type are used present unique problems because of limited space resricting maneuverability. For example, often cleaning must be accomplished under desks, in elevators, or in closets.

Numerous attempts have been made to provide an implement which addresses and solves all these cleaning problems. For example, the R. E. Whittaker Co. distributes an implement known as THE ROTO WASH ®. That machine seeks to replace mops, wringers, pile lifters, buckets, floor machines, and carpet shampoo and extraction equipments. Not only does it seek to provide a machine that is able to handle any type of floor surface, but it also provides a configuration which makes it maneuverable and, therefore, able to be used in limited sized spaces.

THE ROTO WASH ®, as an example of various floor working machines, provides a forked handle to facilitate movement of the device over the floor being worked. When the handle is made to extend generally vertically, transport wheels are lowered from the chassis of the device so that the implement can be moved from one location to another. When the operator wishes to utilize the implement for its intended purpose, he need only pivot the handle rearwardly in order to retract the transport wheels. Motive force of the chassis is, with the wheels in this retracted position, provided by the operator and a pair of rotating brushes.

Because of the retractability of the wheels, they are, necessarily, quite small. As a result, the mobility of the implement, even when the wheels are in the transport position, is relatively restricted. This would, of course, be true also of other equipments of the type of THE ROTO WASH ®. Implements of this type are not, therefore, able to be transported quickly and easily from one location to another without their being picked up and placed on the bed of a transporting vehicle.

It is to these desirable features dictated by the prior art and the deficiencies presently existent that the present invention is directed. It is an improved carriage capable of quickly and easily mounting an implement used for working floors and for transporting that implement to another location without the restriction imposed by transport wheels which are an integral part of the implement.

SUMMARY OF THE INVENTION

The present invention is a carriage for use with an implement having a chassis, a maneuvering handle with at least one arm mounted to one of opposite sides of the chassis for forward and rearward pivoting with respect to an intended direction of movement of the chassis, and a lip carried by the chassis. The carriage is intended to be used to transfer the implement from one location to another and includes structure for receiving and retaining therein the chassis lip. Means are provided to hold the maneuvering handle arm against pivoting when the structure is secured to the arm. Means are further provided for mounting the other structure comprising the invention for movement over a surface such as a floor.

Although not essential for operation of the present invention, it is envisioned that the catch means for receiving and retaining the chassis lip would function with respect to a lip defined by one of a pair of transport wheels retractably disposed beneath each of opposite sides of the chassis. A track can be provided for receiving and retaining the transport wheels therein.

In one embodiment of the invention, the maneuvering handle arm is held by providing a clip positioned relative to the track so that the pivotally mounted maneuvering handle arm can be rotated into the clip and captured thereby. The clip can be moved between a first position in which the handle arm can be freely pivoted through an entry slot in the clip, and a second position in which, when the arm has been pivoted through the slot, it is captured and held within the clip. The clip would normally be biased to its second position so that the routine position thereof would be one in which the clip would hold the handle arm.

The track and clip can be interconnected by a strut which, when the handle arm is captured within the clip, would be aligned along the arm. The strut can be provided with an internally threaded aperture through which an externally threaded projection can be made to reciprocate. An end of the projection can engage the handle arm as it is threadably moved through the aperture and, as it is continued to be rotated, draw the strut in a direction wherein the clip is positively held in its second position.

A second embodiment would employ structure for holding the handle arm against pivoting which utilizes a member defining an eye therein. The member would be slidably disposed along the handle arm portion and be sized and shaped to allow its passage over the strut yet be small enough so as to preclude appreciable relative movement of the strut relative to the handle arm portion when it is slid over the two.

The motive means for facilitating movement of the carriage mounted implement over the floor surface can include a pair of wheels spaced from each other along a shaft at a distance to accommodate the chassis of the implement therebetween. Such wheels can have a diameter so that, when the track is seated on the floor, the wheels would be slightly elevated. By so structuring the carriage, it can be brought into position relative to the implement chassis and the track seated on the floor so that the carriage will not move along the floor.

The present invention is, thus, an improved carriage structure for quickly and easily transferring a floor working implement from one location to another. More specific features and advantages obtained in view of those features will become apparent with reference to the DETAILED DESCRIPTION OF THE INVENTION, appended claims, and accompanying drawing figures.

DETAILED DESCRIPTION OF THE INVENTION

Figure 1:
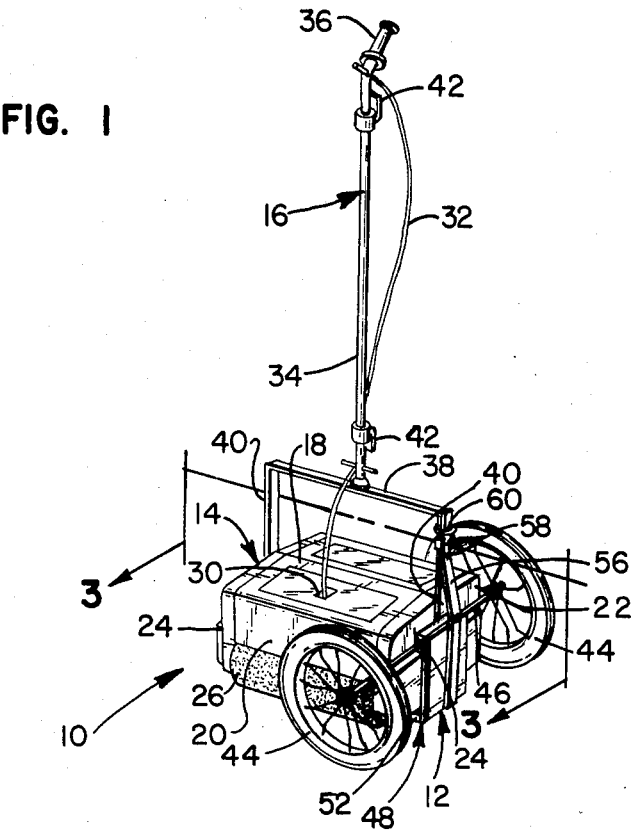
FIG. 1 is a perspective view of the carriage in accordance with the present invention mounting a floor working implement thereon.

Referring now to the drawings wherein like reference numerals denote like elements throughout the several views, FIG. 1 illustrates a floor working implement 10 as mounted by a carriage apparatus 12 in accordance with the present invention. The implement 10 is of a type as known in the prior art. It will be described herein, however, for purposes of recitation of its various parts with respect to which the present invention functions.

The implement 10 includes a chassis 14 and a handle 16. The chassis 14 includes a housing formed by a top wall 18, front and rear walls 20, 22, and a pair of opposite lateral walls 24 extending downwardly below the bottoms of the front and rear walls 20, 22. Typically, the side walls 24 have a pair of rotating brushes 26 journalled therebetween. In an implement such as THE ROTO WASH ®, these brushes 26 are contra-rotating and turn at speeds in the order of 650 RPM. Rotation of the brushes 26 enable the machine 10 to glide over the surface being worked to scrub, polish, or perform another function upon the surface.

Figure 3:
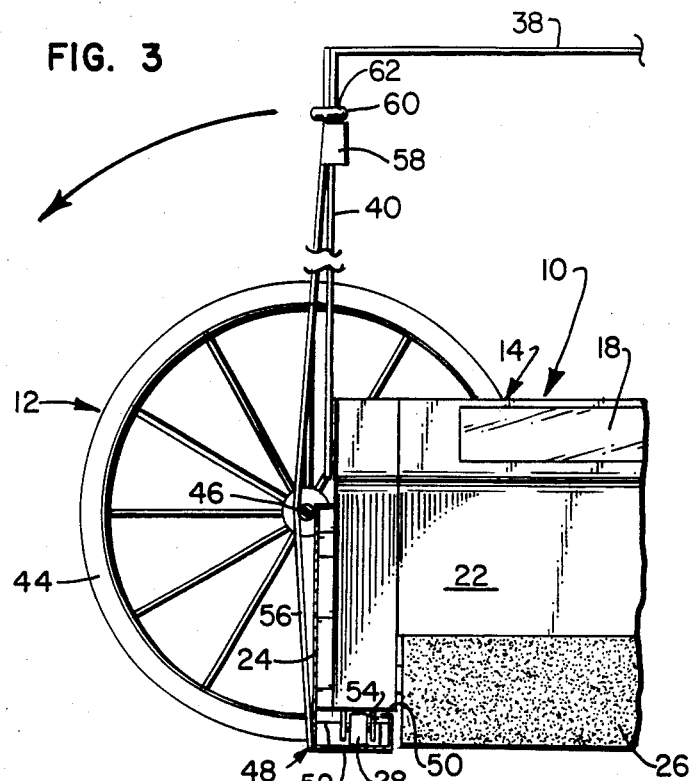
FIG. 3 is a side elevational view of the carriage utilizing a first embodiment of a structure for securing a strut of the carriage to an arm of the implement maneuvering handle.
Figure 4:
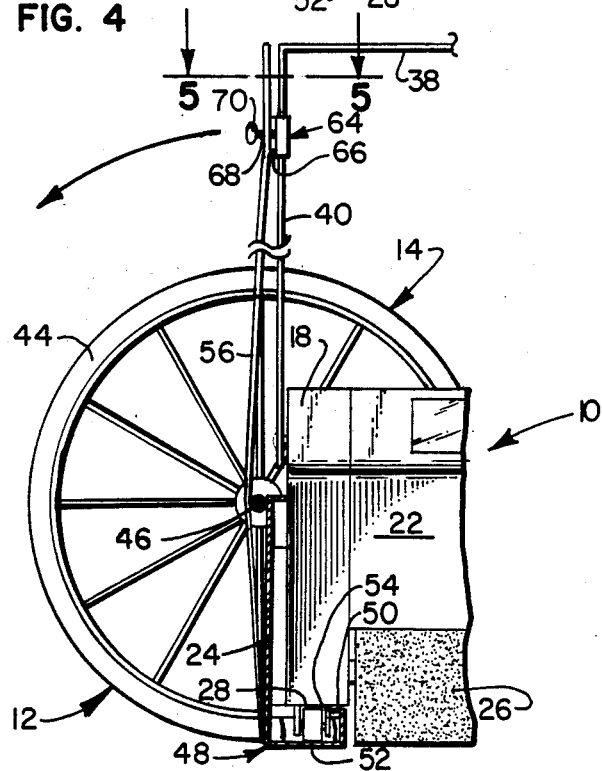
FIG. 4 is a side elevational view of the carriage utilizing a second embodiment of a structure for securing a strut of the carriage to an arm of the implement maneuvering handle.

As best seen in FIGS. 3 and 4, such a machine 10 can be provided with retractable wheels 28 which depend downwardly from each of the opposite lateral walls 24 of the chassis housing 14. These transport wheels 28 are linked to the handle 16, as will be discussed hereinafter, so that, when the handle 16 is in a generally vertically oriented position, they will be extended downwardly. As the handle 16 is pulled back to a position in which it affords the operator the ability to control the implement 10, the wheels 28 are retracted.

As seen in the figures, the transport wheels 28, in their extended positions, are disposed so that their lowermost surfaces are approximately at a level of the lowermost surfaces of the brushes 26. A machine such as THE ROTO WASH ® employs a feature wherein turning off a brush actuation motor (not shown) effects lifting of the cleaning bristles from the floor surface in order to extend the brush life. By so positioning the transport wheels 28, the brush life extention feature is furthered.

Figure 2:
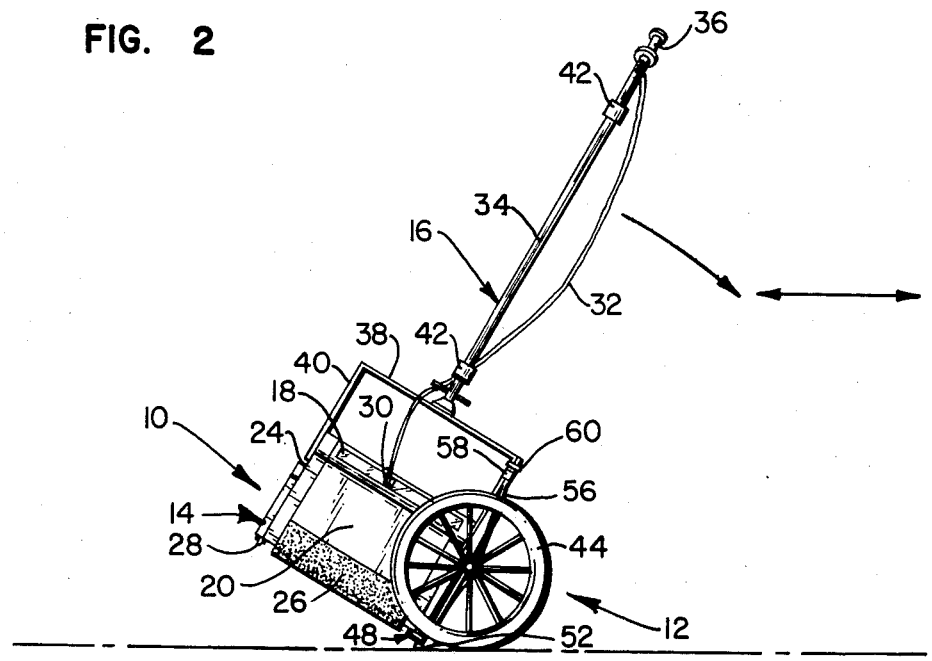
FIG. 2 is a side elevational view of the carriage and accompanying implement viewed in FIG. 1, as shown in a transport position.

As seen in FIGS. 1 and 2, the top wall 18 of the chassis 14 has an aperture 30 formed therein. This aperture 30 affords access to the interior of the chassis housing 14 to a power cable 32.

The handle 16 of the implement 10 includes a generally linearly extending shaft 34 having, at its upper end, a slightly angled hand grip portion 36. The lower end of the shaft 34 intersects a fork which includes a generally horizontal portion 38 and two arms 40 extending downwardly from the horizontal portion 38 at a sufficient distance from one another to receive the chassis housing therebetween. The lower end of ech of these downwardly extending arms 40 is pivotally mounted to one of opposite lateral walls 24 of the chassis housing 14. Means (not shown), interior to the chassis housing 14, can be provided for linking the transport wheels 28 to the position of these arms 40 to effect retraction and extention of those wheels 28.

The generally linearly extending shaft portion 34 of the handle 16 can be provided with a pair of cleats 42. These cleats 42 can provide structure about which the power cable 32 for actuating the brush motor can be wound for storage. It will be understood that, although a power cable 32 is shown as being a conduit by which an external power source can be connected to the implement 10, the present invention is as applicable to usage with other embodiments of implements. For example, the present carriage structure 12 could be used equally as well with a device having a self-contained power source.

FIG. 3 illustrates a carriage apparatus 12 in accordance with the present invention employing a first embodiment of structure to be used for holding an arm 40 of the implement handle 16 against pivoting so that the handle 16 can be used as a handle to guide the carriage mounted implement 10 as it is being maneuvered from one location to another. The carriage 12 includes a pair of wheels 44 spaced from one another along a shaft 46. The wheels 44 are spaced at a distance at least as great as the distance between the front and rear panels 20, 22 of the implement 10 in order that the implement 10 be able to be accommodated and received between the wheels 44 from a side aspect. This spatial relationship is best illustrated in FIG. 1. The wheels 44 are mounted for rotation independently of one another at opposite ends of the shaft 46.

The shaft 46 carries a bracket 48 which depends downwardly therefrom. The bracket 48 carries a track 50 defining shelf 52 at the lower end thereof. The track shelf 52 is disposed relative to the shaft 46 so that, when the track 50 is seated on the floor on which the implement 10 is positioned, the wheels 44 at opposite ends of the shaft 46 will be slightly elevated from the floor.

The track 50 has an elongated aperture 54 formed therein. The aperture 54 is sized and shaped so that the transport wheels 28 of the implement 10 can be received and retained therein.

A strut 56 extends upwardly from the bracket 48. While the bracket 48, as seen in FIG. 3, is secured to one side of the wheel mounting shaft 46, the strut 56 extends and bends around the opposite side of the shaft 46. The strut 56 can be angled slightly so that an upper end thereof is, when the maneuvering handle 16 is pivoted appropriately, aligned along side one arm 40 of the handle fork.

The strut 56 can be formed from a piece of bar stock generally rectangular in cross section. Retaining panels 58 can be secured in an appropriate manner such as welding to opposite smaller sides of the cross section of the strut 56.

When the implement 10 is to be mounted to the carriage 12, the carriage 12 can be brought into place closely proximate one side thereof. The implement 10 can be tilted so that the side proximate the carriage 12 is lifted, and the carriage 12 inserted so that the track 50 is disposed beneath the transport wheels 28 of the implement 10. The handle 16 would, of course, be in a generally vertical position so that the transport wheels 28 were extended.

With the carriage 12 in this position relative to the implement 10, the implement 10 could be lowered until the transport wheels 28 are received within the track 50. As the implement 10 comes down on the track 50, the bottom of the bracket 48, being flat, will tend to come into full engagement with the floor. As this occurs, the strut 56 will be urged inwardly until it tends to be aligned along the arm 40 of the maneuvering handle 16 of the implement 10.

If necessary, the handle 16 can be adjusted by pivoting it relative to the implement chassis 14 so that the arm 40 of the handle 16 proximate the strut 56 is received between the retaining panels 58. One or both of the arms 40 of the maneuvering handle fork can carry a member 60 similar to a chain link. If it is intended that the implement 10 be secured to the carriage 12 by only one of the arms 40 in particular, only that arm 40 need be provided with the link 60.

With the arm 40 in a position aligned along side the strut 56 and received between the retaining panels 58, the link 60 can be slid outwardly and downwardly over the arm 40 and around the strut 56. The upper end of the strut 56 would, of course, not extend above the uppermost portion of the arm 40. If it did, the link 60, as it was slid outwardly and downwardly, would not be able to encircle the strut 56.

An eye 62 formed in the link 60 can be of a size and shape so that it can, within its boundaries, capture both the arm 40 and the strut 56. The eye 62 can be small enough, however, so that it will allow little play.

With the chain link 60 so capturing the arm 40 and the strut 56 concurrently, the handle 16 of the implement 10 is made, in effect, to be the handle of the carriage 12. An operator can, thereby, pivot the arm 16 toward him to tilt the carriage mounted implement 10 to a position at which the track 50 has been elevated above the lowermost portions of the shaft mounted wheels 44 of the carriage 12. The assembly will then be free to be moved from one location to another quickly and easily, since the operator need not be limited by the smaller circumferences of the transport wheels 28.

Figure 5:
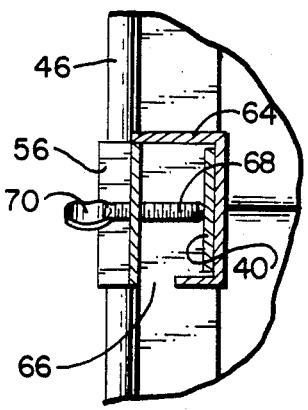
FIG. 5 is a view taken generally along the line 5—5 of FIG. 4.

FIGS. 4 and 5 illustrate a second structural embodiment for holding the maneuvering handle arm 44 in alignment adjacent the strut 56. In the embodiment of those figures, the strut 56 is not provided with a pair of retention panels 58, but, rather, with a clip 64 having a lateral entry slot 66. The strut 56 can be configured, with respect to the bracket 48, such that the handle 16 of the implement 10, as it is pivoted toward the strut 56, would not be registered with the entry slot 66 to the clip 64. The strut 56 can bias the clip 64 to this position. This bias could, however, be overcome if the strut 56 is made, for example, of a slightly flexible steel material.

With the transport wheels 28 of the implement 10 received in the bracket track 50, the handle 16 could be pivoted so that one of its arms 40 approaches the clip 64. As the arm 40 approaches the clip 64, the bias of the clip 64 to the position described can be overcome in order to urge it to another position wherein the arm 40 can enter the clip 64 through the slot 66 therein. With the clip 64 in this position, the handle 16 can be continued to be rotated so that the arm 40 enters the clip 64 through the slot 66. Once the arm 40 has so entered the slot 66, the clip 64 can be released so that it returns to its original position with the slot 66 not in registration with the handle arm 40. The handle arm 40 is, thereby, captured within the clip 64.

As an operator of the implement 10 would attempt to tilt the implement 10 by drawing the handle inwardly toward his body, the arm 40 of the maneuvering handle 16 might tend to re-register with the slot 66 and come loose. In order to preclude the occurrence of this re-registration, means can be provided to urge the clip 64 to the position wherein withdrawal is precluded when the arm 40 is captured therewithin. The strut 56 can be provided with an internally threaded aperture to receive a hand screw 68 therethrough. The aperture is provided at a location at which the screw 68, when it is threadably turned so that it passes through the strut 56, will enter the clip 64. A manual tightening hand grip 70 can be provided at an accessible end of the screw 68 to facilely rotate it. As it is made to rotate inwardly into the clip 64, the distal end of the screw 68 can be brought to bear upon the maneuvering handle arm 40 and urge it to a position out of registration with the slot 66 in the clip 64. The position of the arm 40 relative to the strut 56 wherein it is captured within the clip 64 and locked therein is best seen in FIG. 5.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. Carriage apparatus for transferring, from one location to another, an implement having a chassis, a maneuvering handle having at least one arm mounted to one of opposite lateral sides of the chassis for pivoting forwardly and rearwardly with respect to an intended direction of movement of the chassis, and ground engaging transport means carried by the chassis at the one of the lateral sides thereof to which the at least one arm is mounted, comprising:
   (a) track means including a pair of spaced plates for receiving and retaining the chassis ground engaging transport means therebetween;
   (b) a support member extending upwardly from said track means adjacent the arm of the implement, when the ground engaging transport means are received within said track means;
   (c) holding means carried by said support member, detachably securable to the implement handle arm, for holding the arm, when secured thereto, against pivoting; and
   (d) wheel means carried by said support member for mounting said track means, said support member, and said holding means for movement over a surface;

(e) wherein the implement handle is employed, when said holding means is secured to the handle arm, to tilt the implement to be fully supported by said wheel means and to propel the implement over a surface by utilizing said wheel means.

2. Apparatus in accordance with claim 1 wherein the implement ground engaging transport means is defined by at least one implement transport wheel disposed retractably beneath the one of opposite lateral sides of the chassis to which the handle arm is mounted.

3. Apparatus in accordance with claim 2 wherein said holding means comprises:
    (a) a clip having an entry slot and being disposed relative to said track means wherein, when the at least one transport wheel is received in said track means, said clip can be moved between a first position in which the handle arm can be pivoted through said entry slot, and a second position in which, when the handle arm has been pivoted through said slot, the arm is captured by said clip; and
    (b) means for urging said clip to said second position.

4. Apparatus in accordance with claim 3 wherein said urging means comprises a screw, threadably received through an aperture in said support, member impingable upon the handle arm to bias said clip toward said second position.

5. Apparatus in accordance with claim 1 wherein said holding means comprises:
    (a) a clip having an entry slot and being disposed relative to said track means wherein, when the chassis ground engaging transport means are received and retained by said track means, said clip can be moved between a first position in which the handle arm can be pivoted through said entry slot, and a second position in which, when the handle arm has been pivoted through said slot, the arm is captured by said clip; and
    (b) means for urging said clip to said second position.

6. Apparatus in accordance with claim 5 wherein said support member includes a strut interconnecting said track means and said clip, and wherein said urging means comprises a screw, threadably received through an aperture in said strut, which, when the handle arm has been pivoted through said slot, impinges, as it is rotated, upon the arm to urge said clip to said second position.

7. In combination with a floor working implement having a chassis, a maneuvering handle having a pair of diverging arms, each mounted to one of opposite lateral sides of the chassis for pivoting along with the other of the arms forwardly and rearwardly with respect to an intended direction of movement of the chassis, and a pair of transport wheels disposed retractably beneath each of the opposite lateral sides; apparatus for transferring the implement from one location to another, comprising:
    (a) a track for receiving and retaining one of the pairs of transport wheels, said track comprising a shelf and a pair of side walls extending generally perpendicular to said shelf to receive and constrain therebetween said pair of transport wheels received in said track;
    (b) a strut mounted to, and extending upwardly from, said track;
    (c) holding means, connected to said strut, detachably securable to one of said implement handle arms, for holding the arm, when secured thereto, against pivoting; and
    (d) wheel means mounting said track, said strut mounted to said track, and said holding means for movement over a surface; and
    (e) wherein the implement handle is employed, when said holding means is secured to the one of said implement handle arms, to tilt the implement to be fully supported by said wheel means and to propel the implement over a surface by utilizing said wheel means.

8. The combination in accordance with claim 7 wherein said holding means comprises;
    means for maintaining a portion of the handle arm, mounted to the lateral side of the chassis beneath which the pair of transport wheels received in and retained by said track are disposed, aligned along said strut.

9. The combination in accordance with claim 8 wherein said maintaining means comprises an eye defining member slidably disposed on the handle arm mounted to the lateral side of the chassis beneath which the pair of transport wheels received in and retained by said track are disposed, said eye defined in said member being shaped and sized to slide down the arm and over said strut.

10. Carriage apparatus for transferring, from one location to another, an implement having a chassis, a maneuvering handle having at least one arm mounted to one of opposite lateral sides of the chassis for pivoting forwardly and rearwardly with respect to an intended direction of movement of the implement, and ground engaging transport means carried by the chassis beneath at least one of the opposite lateral sides, comprising:
    (a) a track for receiving and retaining the chassis ground engaging transport means;
    (b) a strut mounted to said track;
    (c) a slip carried by said strut, for detachably securing the implement handle arm to said strut and for holding said arm against pivoting, said clip having an entry slot and being disposed relative to said track wherein, when the ground engaging transport means are received in said track, said clip can be moved between a first position in which the handle arm can be pivoted through said entry slot, and a second position in which, when the handle arm has been pivoted through said slot, the arm is captured by said clip;
    (d) holding means including an element received in an aperture in said strut and being longitudinally extendable through the aperture and able to be locked in a plurality of positions along an axis with respect to which said element is extendable, said element, when the handle arm has been pivoted through said slot, impinging, as it is moved toward the arm, upon the arm to urge said clip to said second position; and
    (e) wheel means mounting said track for movement over a surface; and
    (f) wherein the implement handle is employed, when it is secured to said strut, to tilt the implement to be fully supported by said wheel means and to propel the implement over a surface by utilizing said wheel means.

\* \* \* \* \*